Nov. 5, 1963     W. SAMANS     3,109,555
EMERGENCY PRESSURE RELIEF DEVICE
Filed March 29, 1961     2 Sheets-Sheet 1
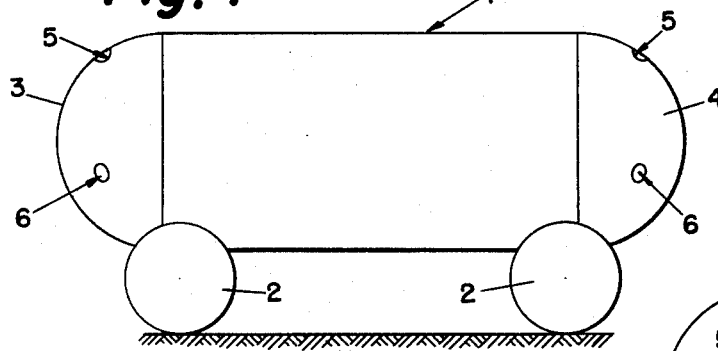
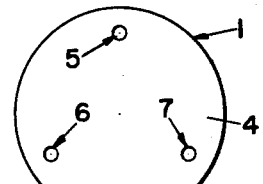
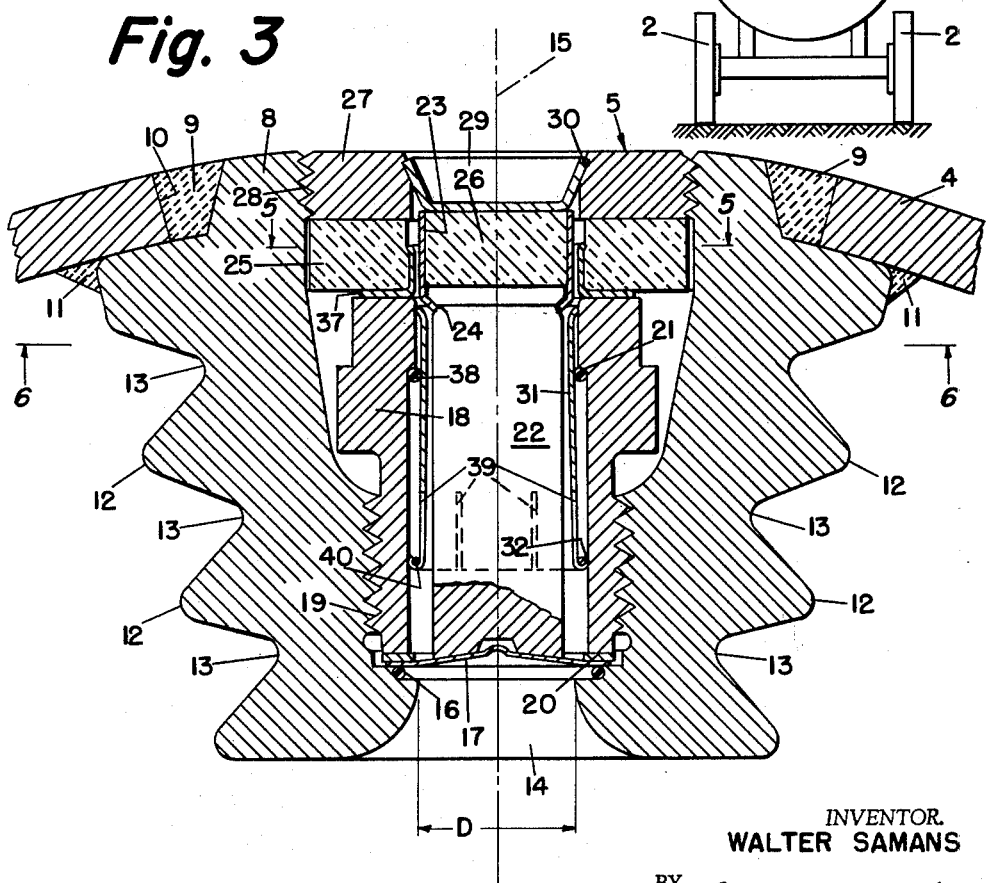
INVENTOR.
WALTER SAMANS
BY *Robert D. Spindle*
ATTORNEY Nov. 5, 1963  W. SAMANS  3,109,555
EMERGENCY PRESSURE RELIEF DEVICE
Filed March 29, 1961  2 Sheets-Sheet 2
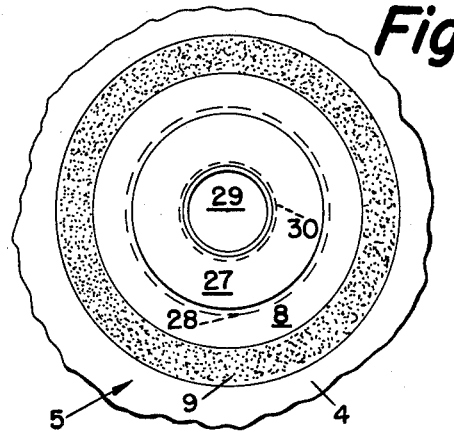
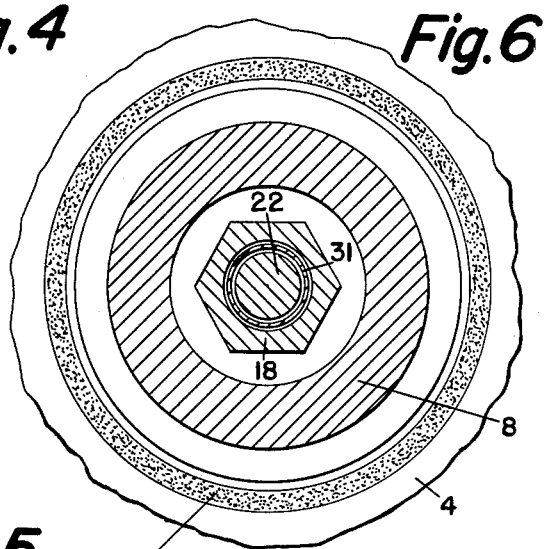
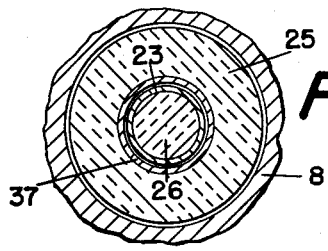
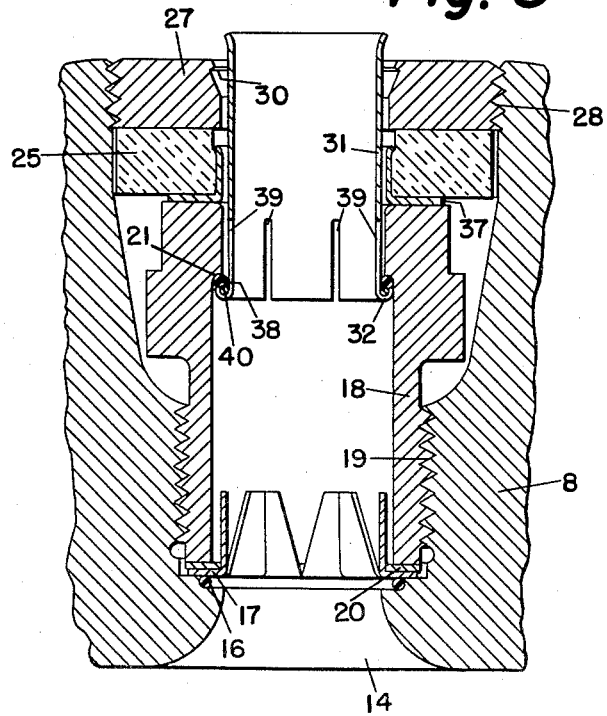
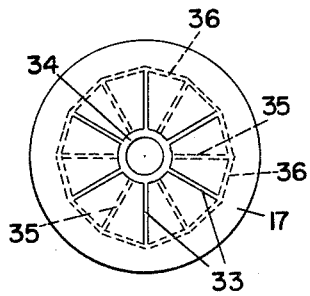
INVENTOR.
WALTER SAMANS
BY
Robert O. Spindle
ATTORNEY

United States Patent Office 3,109,555
Patented Nov. 5, 1963

3,109,555
EMERGENCY PRESSURE RELIEF DEVICE
Walter Samans, Clearwater, Fla., assignor to Sun Oil Company, Philadelphia, Pa., a corporation of New Jersey
Filed Mar. 29, 1961, Ser. No. 99,138
9 Claims. (Cl. 220—89)

This invention relates to an emergency pressure relief device, and more particularly to a device of this type useful for tanks in which a liquid petroleum-derived product is being stored or transported. By way of example, the device will be described as applied to a mobile tank in which liquefied petroleum gas (L.P.G.) is being transported. It is to be understood, however, that it may be applied also to fixed or stationary storage tanks, as well as to tanks in which any other volatile liquid (either flammable or nonflammable) is being stored or transported.

The material known as L.P.G. (which could, for example, be propane) is commonly transported, under superatmospheric pressure, in tanks mounted on trucks. When such trucks become involved in accidents, external fires almost always break out in the vicinity of the tanks, these fires being fed by leakage from the tank when its contents are flammable. The heat produced by such a fire can cause an extremely high vapor pressure in the tank or receptacle. Although the tank is equipped with one or more regular safety relief valves, these are designed to relieve only the conditions encountered in normal service, resulting from the evaporation of the liquid by the highest normal ambient temperature expected, and are quite inadequate (in vapor handling capacity) to relieve the high vapor pressure resulting from an external fire. As a result, pressure tanks containing volatile liquids, exposed to accidental external fire, sometimes rupture, causing substantial damage to life and property. To provide additional regular safety relief valves, or (in the alternative) to make the original regular valves, of sufficient capacity to relieve a reasonably predictable fire-induced excess vapor pressure, would only add to the possibility of damage to protruding parts, with greater chance of leakage under normal service conditions.

One of the main objects of this invention is to provide an (additional) novel emergency pressure relief device for pressure tanks, to supplement the regular safety relief valves required for normal service. The number of such additional devices, and their locations, is made to suit the contents of the tank with which they are to be used, these additional devices functioning to prevent the rupture of such tanks under conditions of exposure to accidental, external fire.

Another object is to provide an emergency pressure relief device for pressure tanks which is inexpensive, easy to maintain, and not subject to risk of being damaged accidentally.

A further object is to provide an emergency pressure relief device for pressure tanks which is substantially foolproof and tamper-proof.

A still further object is to provide an emergency pressure relief device for pressure tanks which is designed to operate at a predetermined excess pressure, but which will do so only if the temperature at the device has reached a preselected value which it will reach only under conditions of exposure to fire.

Still another object is to provide an emergency pressure relief device for pressure tanks which will function to prevent the rupture of such tanks under conditions of exposure to accidental, external fire, yet will not function unless the device, at the time of such exposure, is in the vapor space of the tank or receptacle.

The foregoing and other objects of the invention are accomplished, briefly, in the following manner: A receptacle equipped with the emergency pressure relief device of the invention has an aperture through one of its walls, in which is fixed (as by welding) a bushing which provides (by way of its central port) a flow passage which thus extends through the receptacle wall. The outer surface of that portion of the bushing which extends into the receptacle is provided with annular ribs, to increase its heat-radiating surface area. A frangible disk closure, designed to rupture at a predetermined pressure, is sealingly mounted near the inner end of this passage. A fusible metallic member, mounted in the passage, firmly engages the outer face of the disk and effectively prevents rupture of the disk until this member is heated sufficiently to fuse or melt. A member of heat insulating material covers the outer end of the fusible member, while a cup-shaped closure (which is designed to pop out of its seat when heat sufficiently) covers the outer end of the passage and retains the heat insulating member and fusible member in position. A tubular nozzle member is slidably mounted in the passage, to be moved outwardly when the disk ruptures. In the case of a closed pressure receptacle mounted on a truck so that it is mobile, a plurality (for example, three) of the above-described pressure relief devices are mounted in each domed end (formed head) of the receptacle, in such a way that at least one of the devices will always be in the vapor space of the receptacle even though such receptacle may have been overturned as the result of an accident.

A detailed description of the invention follows, taken in conjunction with the accompanying drawings, wherein:

FIG. 1 is a side view, somewhat schematically shown, of an L.P.G. tank truck, illustrating the locations of several emergency pressure relief devices according to this invention;

FIG. 2 is an end (rear) view of the same truck, again somewhat schematically depicted;

FIG. 3 is a vertical longitudinal section through a single pressure relief device according to the invention;

FIG. 4 is a top or plan view of the pressure relief device of FIG. 3;

FIG. 5 is a sectional view taken along line 5—5 of FIG. 3;

FIG. 6 is a sectional view taken along line 6—6 of FIG. 3;

FIG. 7 is a top view of a frangible disk closure; and

FIG. 8 is a vertical longitudinal section somewhat similar to FIG. 3, but illustrating the device in its operated condition, i.e., in its pressure relieving position.

The main purpose of the emergency pressure relief device of the present invention is to prevent the destructive rupture of a pressure tank mounted on a truck under emergency conditions of exposure to accidental, external fire, no matter in what position the tank may be after a collision or other accident which may cause overturning thereof. The pressure relief device may also be used, however, with fixed or stationary tanks, as well as with tanks on ships. The regular or ordinary safety relief valves, whether designed for stationary storage tanks or for tanks mounted on trucks, accommodate all possible conditions encountered in normal service, taking into account the effect, on evaporation of the receptacle contents, of the highest possible ambient temperature; the accommodation is for a build-up of the vapor pressure in the receptacle to ten percent above the required setting of the relief valve, when discharging. The required setting or set pressure is the same as the design pressure for the receptacle, up to a temperature of 650° F. in the metal of the receptacle or tank. However, recent experience (within the last few years) has shown that one cannot predict the maximum vapor pressure to which a pressure receptacle may be subjected, under conditions of exposure to an external fire. It may therefore be realized that, to prevent rupture of the receptacle under such conditions, a separate emergency pressure relief device is very desirable, if not absolutely essential.

FIGS. 1 and 2 are schematic side and rear views, respectively, of an L.P.G. tank truck. A tank 1 is illustrated as being mounted for movement along the surface of the earth, by means of truck wheels 2. The tank 1 is a closed receptacle which is adapted to contain and transport a volatile liquid, such as L.P.G. of the propane type. Tank 1 operates at superatmospheric pressure. The receptacle 1 has a straight cylindrical body, and is closed at its two ends by the respective formed heads or domed closures 3 and 4, which are illustrated as hemispherical in shape. There being always an outage (vacant space) in such receptacles, as filling capacity is limited by law and customary safety practices, the highest part of the receptacle (in any position thereof, whether the normal upright one or an abnormal one, the result of an accident) will comprise the vapor space thereof. A plurality of the emergency pressure relief devices of this invention (to be later described in detail) are mounted on the receptacle 1. Actually, they are inserted in the receptacle shell so as to be flush with the outside surface, as will later become apparent. By way of example, there may be three of such devices in each of the formed head ends 3 and 4 (see FIG. 2), arranged to be 120° apart around the circumference of the dome. In FIG. 2, these devices in head 4 are indicated at 5, 6, and 7, and the same reference numerals are used for head 3. In the normal upright position of the tank or receptacle, the top device 5 in each end of the horizontal tank 1 would be in the vapor space thereof. With three devices 5, 6, and 7 in each end of the tank, angularly spaced as illustrated, it is contemplated that no matter what may be the position (whether normal or abnormal) of the tank at any time, at least one of the emergency pressure relief devices 5–7 will be in the vapor space of the tank at that time. This is true even though the tank may have overturned, e.g. after a collision.

All of the pressure relief devices 5–7 are of identical construction; this construction will now be described in detail, referring to FIGS. 3–7. For convenience in illustration, in FIG. 3 the pressure relief device is shown as extending vertically; however, in an actual installation the devices 5, 6, and 7 extend more or less horizontally, as will be appreciated from an examination of FIG. 1. In FIG. 3, the domed end closure is denoted by numeral 4, while the pressure relief device is denoted by numeral 5, both for the sake of convenience; it will be appreciated that the ensuing description applies equally well to domed closure 3, and to pressure relief devices 6 and 7.

A metallic bushing 8 (which may also be thought of as a housing) has its outer edge welded at 9 in a circular aperture 10 which is provided in the hemispherical wall 4 of receptacle 1. Another circular weld 11 joins the outer edge of bushing 8 to the inner face of wall or head 4, inside the receptacle. The bushing 8 is formed of cast steel or of nodular iron, both of which materials have a high thermal conductivity. The bushing 8 is elongated, and the major portion of the length thereof extends inside the receptacle; the outer end of the bushing is curved to match the curvature of wall 4, and this bushing end is located flush with the outer face of wall 4. As illustrated in FIG. 3, the outer (radially speaking) surface of bushing 8 is tapered, so that it extends generally at an acute angle to the longitudinal axis 15 of the bushing, and that portion of bushing 8 which extends into the receptacle has formed thereon (as by casting) a plurality of spaced annular ribs 12, separated by annular grooves 13. This ribbed construction increases the surface area of the bushing's outer surface, and thus the bushing has a greater heat-radiating surface per unit of weight than if not ribbed.

Bushing 8 has a central port 14 whose smallest diameter is denoted by D, this port being centered on the longitudinal axis 15 of the device 5. Port 14, which extends throughout the entire length of bushing 8, is intended to allow for a liquid flow passage which (when opened up as a result of the pressure relieving action, to be later described) extends from the interior of the receptacle to the exterior thereof. When so opened up, this flow passage has a diameter D which is substantially freely open and unimpeded. The diameter D is such that the flow capacity, through the flow passage mentioned, equals the required discharge capacity set for the contents of the tank under fire exposure conditions.

At the lower (inner) end of bushing 8, there is provided an upwardly (outwardly) facing seat having a diameter greater than D, on which there is seated a sealing O-ring 16. A frangible disk closure 17, which is adapted to rupture at a predetermined pressure and the construction of which will be described more in detail hereinafter, rests against the upper or outer side of O-ring 16, and closure 17 is forced against this O-ring (thereby to provide a seal) by structure to be described hereinafter. It may be seen that the lower or inner face of disk 17 (which may be thought of as a rupture disk) is exposed to the space inside the receptacle or tank. Disk closure 17 is made, for example, of the material known as Phosphor bronze.

In order to hold the disk closure 17 to its seat against O-ring 16, thereby to provide a seal near the outer edge of this disk, an inner bushing 18, preferably made of bronze, is utilized. Bushing 18 has therein a central port, concentric with axis 15, which extends throughout the length of this bushing. For some distance downwardly from its top or outer end, this central port has a diameter approximately equal to D, but for the remainder and greater portion of its length, it has a diameter somewhat in excess of D. The junction between the two different-diameter portions of this central port forms an internal shoulder 21, which will be further referred to hereinafter. Bushing 18 is provided near its lower or inner end with a set of male threads which are adapted to engage a set of female threads 19 provided in bushing 8, somewhat upwardly or outwardly of the O-ring seat. The diameters of the male and female threads just referred to are considerably in excess of D. The lower or inner end face of bushing 18 is adapted to overlie a radially outer annular area of disk 17, and also O-ring 16. Advantageously, a washer 20 is positioned between the lower end face of bushing 18 and disk 17. This washer has a coating of graphite on its lower or inner surface, which permits it to slide to a small extent on the radially outer area of disk 17 when the bushing 18 is tightened in position for proper seating pressure of disk 17 on O-ring 16. No great downward force is required to be applied by bushing 18, for sealing at the edge of disk 17.

Beginning at its upper or outer end, and extending for some distance downwardly or inwardly therefrom, bushing 18 is formed in the shape of a hollow hexagonal prism (see FIG. 6), having a distance of some two inches across the "flats." The lower end of this hexagonal portion of bushing 18 is aligned horizontally, more or less, with shoulder 21. This hexagonal outer configuration allows the application of a two-inch hexagon socket wrench to the upper end of bushing 18, for tightening or loosening the bushing 18 in the threads 19.

An elongated fusible solid metallic member (plug) 22, which may be substantially cylindrical in configuration, with a diameter somewhat less than D, is positioned in the central port of bushing 18, with its axis substantially coinciding with axis 15. The member 22 is made of a material such that it fuses or melts when it is heated to a predetermined elevated temperature. The lower (inner) end of member 22 firmly engages the upper (outer) face of disk 17. The circular inner end of member 22 has a sufficient contact area, and this member is held against disk 17 with a sufficient force, to positively prevent rupture of disk 17 until member 22 is heated to its predetermined temperature of fusion, i.e. until member 22 fuses or melts. In other words, only when the fusible member 22 melts will the disk 17 be free to rupture (burst) at its predetermined bursting presusre. Although the disk 17 will rupture or burst under a predetermined excess pressure, it is not free to do so unless the temperature at the device 5 (and at the member 22) has reached the predetermined value, under conditions of exposure to an external fire. This will become clearer as the description proceeds.

The upper (outer) end of member 22 extends inside one end of a tubular thin metallic sleeve 23 whose outside diameter is at least equal to D. Members 22 and 23 are firmly held together at 24, by crimping the sleeve 23 onto the inside member 22.

A hard cellular composite member made of heat insulating material (e.g., sheet asbestos) is positioned over the outer end of the fusible plug 22, to protect or shield the latter against direct radiation of heat from an external fire. A metallic cover plate 27, to be later described, overlies the said composite member. This cover plate, together with the protection afforded by the composite shield, enforces the inflow of heat from an external fire more directly to the ribbed wall of bushing 8. A hollow cylindrical (ring-like) outer member 25, made of sheet asbestos, comprises a part of the composite heat insulating member or shield previously referred to. Member 25 has therein a central opening whose diameter is somewhat greater than D, and this member is mounted in a soft steel holder 37. Holder 37 has an upstanding cylindrical wall which is integral with a plate-like horizontal wall which extends radially outwardly from the cylindrical wall. Member 25 is suitably fastened, as by crimping, to the cylindrical wall of holder 37, and the horizontal wall of this holder overlies and rests on the upper (outer) surface of bushing 18. Also made of sheet asbestos, and comprising a further part of the composite heat insulating member or shield, is a cylindrical, plug-like inner member 26 which directly overlies and engages the outer end of plug 22 and is positioned within sleeve 23. The outer cylindrical wall of member 25 is located closely adjacent the inner wall of bushing 8. As previously stated, the members 25 and 26 are both made of heat insulating material.

It is desired to be pointed out that the members 16, 18, 20, and 25 (as well as the disk 17) are all positioned in the central port 14 of bushing 8. The diameter of this port, and particularly the upper (outer) portion thereof, must be sufficient to accommodate (with proper side clearance) these various members.

An annular cover plate 27, whose central opening has a minimum diameter slightly more than D, overlies the member 25, at the upper (outer) end of port 14 of bushing 8. Cover plate 27 is made of steel, or any other suitable metal. Cover plate 27 has at its outer periphery a set of male threads which are adapted to engage a set of female threads 28 provided in bushing 8, at the upper (outer) end thereof. By means of these threads, cover plate 27 can be tightened to the extent necessary to assist in maintaining the assembly of the various parts of device 5. The upper (outer) face of cover plate 27 is flat, and is located substantially flush with the outer end of bushing 8, and with the outer face of wall 4. It may be seen that the device 5 does not project or extend outwardly of the tank wall surface 4, nor does it have any sharp-angled projections which if struck in an accident would open the relief device or make it inoperable.

There may be a conventional locking device (not shown) which spans the threaded joint between cover plate 27 and bushing 8. This will prevent unauthorized rotation or removal of cover plate 27, after the same has once been screwed into its proper position in bushing 8.

A portion of the length of the central opening in cover plate 27 is tapered in the upward or outward direction to provide a frusto-conical surface, the diameter of the opening at its small (or lower) end being slightly more than D, as previously stated. In this tapered opening, a somewhat cup-shaped closure member 29 is firmly mounted. This closure is ordinarily inserted in the aforesaid tapered opening during assembly of the device 5 in the shop, but it may also be replaced in the field, with simple impact-type tools. When the cup closure 29 is properly mounted, the bottom (inner) wall thereof will firmly engage the hard upper (outer) face of heat insulating member 26, to thereby hold the fusible plug 22 downwardly (inwardly) firmly against the frangible disk 17. In this way, the fusible plug 22 is caused to positively prevent rupture of disk 17, until such plug has first melted or fused. The tapered opening in cover plate 27 is aligned or concentric with the central opening in the hollow member 25, with the central port in bushing 18, and with the port 14 of bushing 8. It is desired to be pointed out that these several openings and ports are adapted to together form a flow passage which extends through the receptacle wall 4.

Closure member 29 is made of a metal whose temperature coefficient of expansion is substantially greater than that of the metal of which cover plate 27 is made. The shape and size of closure 29 depend on the diameter at the small end of the tapered opening, which diameter corresponds to the nominal diameter of the seat for the disk closure 17. The height of the side wall of member 29, measured along the taper, is somewhat less than the height (measured along the taper) of the tapered opening in cover plate 27, into which opening the closure 29 fits. A notched annular recess 30 is provided in the tapered opening in cover plate 27, the notch being provided due to the fact that the upper end of this recess is located somewhat below the upper or outer end of the tapered opening. The upper or outer edge of the cup closure 29 is rolled or pressed or impacted into the recess 30, either during the assembly of the device 5 in the shop, or in the field, with impact-type tools. The rolling or pressing or impacting of the cup closure 29 into recess 30 provides a firm engagement between these two members, due to the compressive cold stress impressed on the edge of the cup, and at the same time makes the removal of the cup closure 29 more difficult, without the use of special tools. Thus, the device 5 is made sufficiently fool-proof and tamper-proof.

It is desired to be pointed out that, if necessary, the fusible plug 22 (which operates as a temperature control) can be replaced without having to dismantle the pressure relief parts (i.e., the rupture disk 17 and its associated mounting structure). Thus, the cup closure 29 may be removed by means of a special tool, following which items 23, 26, and 22 may be removed as a unit, and then replaced.

The metal from which cup closure 29 is made, in addition to having a substantially greater temperature coefficient of expansion than that of the metal of cover plate 27, has also a greater heat conductivity than the steel of plate 27. The closure 29 may be made of copper, or any other suitable nonferrous metal. The ratio of the heat conductivities of copper and steel is about 8 to 1, while that of aluminum and steel is about 4 to 1. This ensures that the cup closure 29 will heat up more quickly than the cover plate 27, and to a higher temperature. The ratio of the temperature coefficients of copper and steel is about 1.5 to 1, but with the cup closure 29 at a higher temperature than plate 27, the "total differential expansion" of the closure and cover plate will be even greater. Consequently, radiant heat from an external fire (which will be effective on the upper side or outer side of closure 29) will rapidly cause the upper or outer edge of closure 29 to move radially inwardly away from the surrounding portion of plate 27, thus freeing this cup from recess 30. The continued differential expansion of the cup closure and the cover plate will thus rapidly force this cup from its seat in the cover plate, and it will pop out, thus opening the outer end of the flow passage previously referred to. The asbestos shield 25, 26 under the cover plate 27 helps to concentrate the heat flow to the cup closure, before the same pops out. The action just described occurs only when the emergency pressure relief device (which is exposed to radiant heat from an external fire) is in the vapor space of the tank; when the inner surfaces of the device, and the adjacent tank wall, are covered by or submerged in liquid, the temperature required to produce the above-described action will not be reached.

A substantially tubular nozzle 31, made of thin-walled (26 to 30 gauge) stainless steel tubing for example, is positioned in the central port of bushing 18, between disk 17 and the upper (outer) end of bushing 18. In order to maintain nozzle 31 in proper position (with its upper or outer end just below or inside of the outer end of bushing 18) during normal conditions which include traffic vibrations, an O-ring 38, positioned in the shoulder 21 of bushing 18, tightly (frictionally) engages the outer wall of nozzle 31. The elasticity of element 38, and the tight engagement of the nozzle by this element, provided a retaining force which prevents nozzle 31 from being vibrated or shaken out of position under normal conditions. It may be seen that the tubular nozzle member 31 surrounds, but is spaced radially from, fusible member 22. At its upper (outer) end, member 31 has a more or less conventional nozzle-type throat and a more or less conventional nozzle opening. The tapered opening through the cover plate 27 (into which tapered opening cup closure 29 fits, as previously described) has a diameter at its small (lower, or inner) end which is just large enough to permit the nozzle member 31 to emerge; it is contemplated, as will be described more fully hereinafter, that the upper or outer end of the nozzle will extend beyond the outer wall surface of cover plate 27 (and beyond the outer wall surface 4 of the tank), after the rupture disk 17 opens. This extension of the nozzle ensures that substantially 100% of the vapor discharged through port 14, and through the central port in bushing 18, issues from the device 5 in a stream directed in an upward arc away from the tank 1, thus not adding greatly to the heat radiation toward the surface of the tank, under conditions of an external fire. This will be described further hereinafter.

Six equiangularly-spaced, vertically-extending narrow slits 39 (four of which may be seen in FIG. 3) are provided at the lower end of nozzle 31. These slits, which are open at their lower (inner) ends, extend through the walls of nozzle 31 and have a length on the order of 0.6 inch, measured upwardly from the lower end of the nozzle. Slits 39 are about one thirty-second inch wide at their lower ends, and taper to saw-cut width at their upper (or outer) ends; this increase in the width of the slits at the lower ends thereof results from the inherent resilience in the material (of tubular shape) which has been heat-treated, this resilience becoming evident after, or as, the slits are cut.

At its lower (inner) end, the nozzle member 31 has a rolled-over external bead or lip 32 whose radially-outer edge is adapted to slide along the cylindrical wall of the port in bushing 18. A split-ring 40, made of spring steel, is positioned within the nozzle lip 32. The ring 40 is formed in this way to hold itself within the nozzle bead. By way of example, the O.D. of ring 40 may be about three thirty-seconds inch larger than the O.D. of bead 32, and the gap in ring 40 may be about seven thirty-seconds inch long.

The construction at the lower (inner) end of the nozzle 31, including the slits 39 and ring 40, enables the nozzle to be inserted and removed through the access opening which becomes available when closure 29 is removed. The slits allow the inner end of the nozzle to be squeezed down to a diameter such as to pass through holder 37, and to pass by O-ring 38, etc. A special tool is used to hold the inner end of the nozzle 31 to a diameter such as to permit the nozzle to be inserted, this tool being used during insertion or removal of the nozzle.

Refer now to FIG. 7, which is a top or plan view of the frangible disk closure 17. This disk has therein a die-stamped pattern of circumferential and radial grooves, some of these (shown in solid lines in FIG. 7) being on the upper or outer side of the disk, and the remainder (shown in dotted lines in FIG. 7) being on the lower or inner side of the disk. The grooves on the two sides of the disk are correlated with each other. On the upper (outer) side of disk 17, a series of equiangularly-spaced grooves 33 extend radially outwardly from an inner annular groove 34. The area of the disk radially inside of groove 34 is more or less dome-shaped, as may be seen in FIG. 3. On the lower (inner) side of disk 17, a series of equiangularly-spaced grooves 35 extend radially inwardly from an outer polygonal groove 36, each of the grooves 35 preferably being located so as to bisect the angle between two adjacent ones of the grooves 33, as illustrated in FIG. 7. The described pattern of grooves in the frangible disk closure 17 ensures that the rupture of this disk follows the said pattern (it will be realized that the grooves provide weakened areas in the disk), thus clearing the opening (port in bushing 18) for free discharge when disk rupture occurs. Thus, there is a uniform rupturing action throughout the entire area of the disk (see FIG. 8, wherein the disk 17 is illustrated in ruptured condition); the disk ruptures symmetrically.

The frangible disk closure 17 is designed and arranged to rupture at a predetermined pressure which is more than 110% of the design pressure for the receptacle, and which may be as high as 140% to 150% of that pressure, depending upon authorized or approved practices. Since all pressure vessels (including any type of receptacle to be protected by the device of this invention) are tested, as a safety practice, to 150% of their design pressure, the disk rupture pressure suggested (which is, of course, in excess of the receptacle design pressure) should adequately protect against explosive-type rupture of the tank. The maximum disk rupture pressure (in excess of the receptacle design pressure) allowed may be subject to local regulation, by the proper authorities.

As previously described, the disk closure 17 is prevented from rupturing until and unless the fusible member 22 actually melts or fuses, that is, until and unless member 22 is heated to its predetermined temperature of fusion. Therefore, in designing the rupture disk 17 consideration must be given to the limited temperature range (i.e., to a temperature range the lower end of which is uniquely determined by the temperature of fusion of fusible member 22) within which this disk must operate. The intent here is that the disk rupture pressure, within the limited temperature range, will be specified for each kind of volatile liquid which may be in the tank 1. The material for the disk 17 is selected to be appropriate for the maximum possible (or probable) temperature of the disk.

It may be seen that a certain combination of temperature and pressure must be present before pressure relief is obtained by rupture of disk 17. It is suggested that this temperature-pressure combination permit a maximum pressure, at temperature of the receptacle vapor contents, which will produce a safety factor of not less than two on the ultimate specified strength of the receptacle shell material, or a maximum pressure not over 80% of the yield strength, whichever is lower. Fire fighting will be safe at that limit.

The mode of operation of the pressure relief devices (such as 5–7, in case more than one such device is being used, as previously described in connection with FIGS. 1 and 2) of the invention will now be described in detail. With say three pressure relief devices arranged as described in FIGS. 1 and 2, the metal bushing 8 of the pressure relief device 5 may be either submerged in the receptacle's liquid contents, or it may be in the vapor space of the receptacle (which latter is always nearest the highest part of the receptacle, in any position thereof). Speaking generally, when the outer bushing 8 is submerged in liquid (i.e., when the pressure relief device 5 is in the liquid space of the receptacle being protected), the heat input coming from an external fire in contact with or adjacent to the outer face of the device 5 is dissipated, by the outer wall of the bushing 8, into the liquid contents of the receptacle. More particularly, the ribbed surface 12, 13 of the bushing 8 when submerged in the liquid contents of the receptacle (so that they are below the surface of the liquid) will radiate into the liquid, even when the latter boils, any heat from an external fire to which the device may be exposed, at a faster rate than that at which the heat enters over the fire-exposed area (the end face of bushing 8). Due to this faster rate of radiation from the ribbed face of bushing 8 into the liquid surrounding the same, the temperature effective on the fusible member 22 never reaches a value high enough to cause this member to fuse or melt, under these conditions. The composite asbestos member 25, 26, which is positioned over the upper (outer) end of plug 22, protects the latter from direct radiation (through cover plate 27) from an external fire.

An additional safety feature is provided by the device of this invention, which will aid in positively preventing relief of pressure (by rupture of disk 17) when the device 5 is below the liquid level, in the position the receptacle may have after an accident. If the radiant heat from the external fire should cause the cup closures 29 to pop out of its seat under these conditions, the fusible member 22 might be sufficiently exposed to the heat to cause melting thereof to take place. The fusible metal could then run out (through the central port in bushing 18 and through the tapered central opening in cover plate 27) if such tapered opening is low enough. However, since disk 17 is in intimate contact with the liquid in the receptacle, the temperature of the disk would remain close to the temperature of the liquid, and no rupture of the disk could then occur.

When the ribbed outer surface 12, 13 of the bushing 8 is in the vapor space of the receptacle, under conditions of exposure to an external fire, the heat radiation from these surfaces into the vapor, even with some convection, will be materially lower than the heat influx from the fire applied originally to the outer face of bushing 8. Therefore, the temperature of the bushing 8 and of the space around the fusible member 22 will rise rather quickly to the predetermined temperature of fusion of the metal selected for this member. Member 22 will then melt, or fuse. The melting or fusion of member 22 ordinarily and preferably starts near the inner end of this member, in the vicinity of disk 17. This results from the facts that, under the conditions aforementioned, the temperature of bushing 8 rises, and that the composite asbestos member 25, 26 heat-shields the upper (outer) end of member 22. The material selected for member 22 is that most appropriate for the particular volatile liquid which is to be transported in the receptacle.

Due to the large area of the receptacle exposed to the fire, away from the location of the relief device 5, the vapor in the top of the receptacle (whatever might be the position of the receptacle at the moment being considered) will be under a pressure which corresponds to the temperature of the mass of the liquid in the receptacle, and any extra (higher) temperature in the vapor space will be superheat. Assuming that the device 5 is in the upper part (i.e., the vapor space) of the receptacle at the time that exposure to external fire has begun, the fusible member 22 will melt or fuse when it reaches a predetermined temperature, as described in the preceding paragraph. By this time, the radiant heat impinging on the closure cup 29 will have freed it by causing it to pop out of its seat, as described hereinabove. The removal of closure 29 from its seat will of course open to the atmosphere the upper (outer) end of the tapered opening in cover plate 27, and also the central port in bushing 18, thus opening the flow passage of which these elements form a part. If the outer end of the flow passage referred to is above the disk 17, so that the molten metal (of member 22) overlies the disk, disk 17 will reach the temperature of the melted fusible metal, or of the superheated (if the corresponding higher temperature has been reached) vapor in the receptacle, whichever is higher. The foregoing assumes, of course, that the highest location of the safety device such as 5 is in the vapor space of the receptacle.

Referring again to FIGS. 1 and 2, in the normal position of installation of the tank 1 (assuming that no overturning thereof has occurred) only the top pressure relief device 5, in each end of the horizontal cylindrical tank, would function when the tank is full or nearly so, and this because the top device is the only one which is exposed to vapor, rather than being submerged in liquid. Therefore, for the top device, the heat input due to accidental, external fire would raise the temperature around the fusible member 22 to its predetermined melting point (in the manner previously described). It should be noted that only one end of the tank 1 may be exposed to flame. At this stage of the operation of the pressure relief device (after fusible member 22 has melted), only the rupture disk 17 holds the pressure, and the internal pressure in the receptacle or tank may still be within the limits of capacity (flow for which they are designed) of the normal or regular spring-type relief valves. This is the reason for the requirement (previously set forth) that the disk 17 is to rupture or burst at more than 110% of the design pressure for the tank.

As previously described, under conditions of exposure to an accidental, external fire, the pressure relief device or devices which are in the liquid space of the receptacle do not operate or function, since in these particular devices the temperature does not become high enough to cause fusion or melting of member 22.

However, in the pressure relief device which is in the vapor space of the receptacle, a different action occurs. Such device functions or operates to relieve the pressure. The temperature around the member 22 becomes high enough so that this fusible member melts or fuses, thereby releasing the disk 17 for rupturing or opening. By the time this member has melted, the radiant heat from the fire will have freed cup closure 29, so that it will have popped out of its seat. Assuming that the heat from the fire, acting on the contents of the receptacle, is sufficient to raise the vapor pressure therein to the predetermined rupture pressure of disk 17, this disk ruptures or opens up. It then takes the position illustrated in FIG. 8, wherein the separated pieces or sectors (separated at their radially-inner ends) of the disk are folded upwardly (at their radially-outer ends) to extend along the cylindrical wall defining the center port in bushing 18. This mode of rupture of the disk makes certain that the disk, when ruptured, does not appreciably decrease the cross-section of the flow passage.

When rupture of disk 17 occurs, i.e., when it opens up (cup closure 29 having popped out prior to this time), the first flow of pressured vapor out through port 14, and through the central port in bushing 18, causes the molten metal of member 22 to spew outwardly to the outside of the receptacle, carrying along with it the sleeve 23 and the asbestos plug 26. This leaves a free and unrestricted flow passage to the atmosphere (through the receptacle wall 4) for the relief of the pressure in the receptacle. Vapor, or a liquid vapor mixture, can flow rather freely through this passage, since it is unobstructed. Flow can take place at a high rate through the passage, and explosive-type rupture of the tank or receptacle is prevented, under conditions of exposure to accidental, external fire. Moreover, such rupture is effectively prevented, no matter what may be the position of the tank at the time of the fire, whether overturned or not. Simultaneously with the spewing action just described, the first flow of vapor out through port 14, and through the central port in bushing 18, causes nozzle member 31 to slide outwardly (upwardly in FIG. 3) until it reaches the fully extended position illustrated in FIG. 8, wherein ring 40 (or bead 32) comes into engagement with the lower side of O-ring 38 (the latter being positioned at shoulder 21, as previously described). The engagement of a portion of the nozzle with O-ring 38, and the engagement of the latter with shoulder 21, limits the outward movement of nozzle 31. In its extended position, wherein the outer end of the nozzle extends outwardly beyond the outer wall of the receptacle, the nozzle causes substantially 100% of the discharge through the flow passage to issue from the device 5 in a stream directed in an upward arc away from the tank 1. This means that, if the liquid contained in tank 1 is flammable, the vaporizing stream of liquid-vapor mixture issuing from the device 5 will be directed by the nozzle well away from the tank 1, thus keeping the zone of highest combustion rate far enough away so as not to add greatly to the heat being radiated from the original external fire toward the surface of the receptacle or tank.

FIG. 8 is a view somewhat similar to FIG. 3, but showing the positions of the parts after the pressure relief device has functioned or operated. The cup closure 29 has popped out of its seat; the fusible member 22 has now melted; the disk 17 has now ruptured, and all released (loose) parts of device 5 have been spewed out of the flow passage. At the same instant, nozzle 31 has moved to its extended position, wherein it projects outside of the tank wall, as shown in FIG. 8.

By way of summary, the emergency pressure relief devices and scheme of the present invention provide the following desirable features. The arrangement of FIGS. 1 and 2 results in the minimum practicable number of devices, per tank. The out flow is directed (by the nozzle, when in its FIG. 8 or extended position) away from the tank 1. All of the pressure devices are of identical design (illustrated in FIGS. 3–8), irrespective of their locations on the tank. The pressure relief device has no moving parts, so is easy to maintain, and it has a relatively simple and inexpensive construction. The relief device does not project outside of the tank wall surface, and is thus not subject to damage by being struck in an accident. The relief device has a capacity of flow, per device, sufficient to relieve the internal pressure rapidly enough to prevent rupture of the tank. The device is of a design which is tamper-proof and fool-proof, since a special impact tool is required to remove the cup closure 29, in order to adjust or dismantle the device. The device will not operate unless, at the time of exposure to external fire, such device is in the vapor space of the tank, no matter what may be the position of the tank after the same comes to rest in an accident involving fire. The device will operate under a predetermined excessive pressure, but it is not free to operate unless the temperature at the device has reached a predetermined value, under fire exposure conditions. The device is positively prevented from operating if it is below the liquid level in the tank, no matter what the position of the tank may be after an accident. The device is so constructed that the temperature-responsive parts thereof can be replaced without having to dismantle the pressure-relief or pressure-responsive parts.

If a valve fitting, or any other exterior pipe connection on the tank, is broken, and if fire follows the discharge of the tank's contents, the flame may be partly deflected under the tank, or it may impinge on one or more of the emergency or supplementary pressure relief devices of this invention. But unless this occurs when the receptacle (tank) is empty or almost so, the outer bushing 8 of the devices affected will be submerged in liquid, which means that the devices affected will not operate or function, due to the action previously described (fusible member 22 not melting in this case). The vapor accumulated due to evaporation of the tank's contents (as a result of heat from the fire) will be relieved by the blowing of the regular safety valves normally provided, at 110% of the set discharge pressure for the valves, the pressure-relieving discharge through the valves taking place up to their rated total discharge capacity. If, at the time of this breakage and fire, the tank is nearly empty, the interval between the blowing of the regular safety valves and the dropping of the pressure will be that much shorter.

It is within the scope of this invention to mark the outlet of the pressure relief device of the invention, to indicate whether or not tightness is maintained during normal service. An indication of this tight condition can be provided by suitable means at or near the cup closure 29. Such means, which are well known and therefore are not disclosed in detail herein, would operate to show by sound, color, or in other suitable manner, that there is a possible leak in or around the disk 17.

In the shop, when the emergency pressure relief devices of this invention are first being installed, a test may be made to determine the pressure-tightness of the seal provided by frangible disk 17. This test would be made after disk 17 and bushing 18 were put into place, and while a man is still inside of the tank 1. A substitute insert could be provided for the cover plate 27, this insert having a small pipe connection extending therethrough. Air may be supplied under pressure through such pipe connection, against the upper (outer) side of disk 17. This provides a test for the pressure-tightness of the seal at disk 17.

On a later replacement of any of the parts of the device, it would be seldom that the disk 17 and its backing bushing 18 would need to be disturbed. If these items were disturbed, the leakage test mentioned in the preceding paragraph could be repeated (and any leakage occurring would be expected to be very slow); however, the man would not be allowed to enter the tank, for the leakage test, until the tank was gas freed, in an approved manner.

The invention claimed is:

1. In a pressure relief device for the vapor space of a closed receptacle containing a volatile liquid, means providing a flow passage, a frangible disk closure in said passage and having its inner face exposed to said vapor space, said disk being adapted to rupture at a predetermined pressure; an elongated fusible metallic member positioned in said passage and having one end thereof firmly engaging the outer face of said disk; fastening means engaging the other end of said member to hold such member securely in said passage, and an elongated open-ended tubular member slidably mounted in said passage, said tubular member surrounding but being spaced from said fusible member.

2. In a pressure relief device for the vapor space of a closed receptacle containing a volatile liquid, means providing a flow passage, a frangible disk closure positioned adjacent the inner end of said pasage and having its inner face exposed to said vapor space, said disk being adapted to rupture at a predetermined pressure; an elongated fusible metallic member positioned in said passage and having its inner end firmly engaging the outer face of said disk, thereby to prevent rupture of such disk until said member is heated to its predetermined temperature of fusion; and a closure member fastened adjacent the outer end of said passage and in firm contact with the outer end of said metallic member, said closure member becoming unfastened from its operative position in said passage in response to radiant heat from an external fire impinging on said closure member.

3. A device in accordance with claim 2, wherein said closure member is cup-shaped, with its side wall normally engaging the wall of said passage.

4. A device in accordance with claim 2, wherein said closure member is made of a material having a temperature coefficient of expansion substantially different from that of the material defining said passage.

5. In a pressure relief device for the vapor space of a closed receptacle containing a volatile liquid, means providing a flow passage, a frangible disk closure positioned adjacent the inner end of said passage and having its inner face exposed to said vapor space, said disk being adapted to rupture at a predetermined pressure; an elongated fusible metallic member positioned in said passage and having its inner end firmly engaging the outer face of said disk, thereby to prevent rupture of such disk until said member is heated to its predetermined temperature of fusion; a member of heat insulating material positioned in engagement with the outer end of said fusible member, and a closure member fastened adjacent the outer end of said passage and in firm contact with said heat insulating member, said closure member becoming unfastened from its operative position in said passage in response to radiant heat from an external fire impinging on said closure member.

6. A device as described in claim 5, wherein said closure member is cup-shaped, with its side wall normally engaging the wall of said passage.

7. A device as described in claim 5, wherein said closure member is made of a material having a temperature coefficient of expansion substantially different from that of the material defining said passage.

8. A device as described in claim 5, wherein said closure member is cup-shaped, with its side wall normally engaging the wall of said passage, and wherein said closure member is made of a material having a temperature coefficient of expansion substantially greater than that of the material defining said passage.

9. In a pressure relief device for the vapor space of a closed receptacle containing a volatile liquid, means providing a flow passage, a frangible disc closure positioned adjacent the inner end of said passage and having its inner face exposed to said vapor space, said disc being adapted to rupture at a predetermined pressure; an elongated fusible metallic member positioned in said passage and having its inner end firmly engaging the outer face of said disc, thereby to prevent rupture of such disc until said member is heated to its predetermined temperature of fusion; and a cup-shaped closure member having its side wall normally engaging the wall of said passage adjacent the outer end thereof and in firm contact with the outer end of said metallic member, said closure member being made of a material having a temperature coefficient of expansion substantially greater than that of the material defining said passage, said closure member becoming unfastened from its operative position in said passage in response to radiant heat from an external fire impinging on said closure member.

References Cited in the file of this patent

UNITED STATES PATENTS

| | | |
|---|---|---|
| 929,974 | McNutt | Aug. 3, 1909 |
| 1,489,703 | Johnson | Apr. 8, 1924 |
| 1,898,482 | Doughty | Feb. 21, 1933 |
| 2,271,786 | Watkins | Feb. 3, 1942 |
| 2,522,962 | Reger | Sept. 19, 1950 |